No. 734,315. PATENTED JULY 21, 1903.
T. H. GARLAND.
EXCAVATING MACHINE.
APPLICATION FILED JUNE 6, 1901.
NO MODEL.
2 SHEETS—SHEET 1.
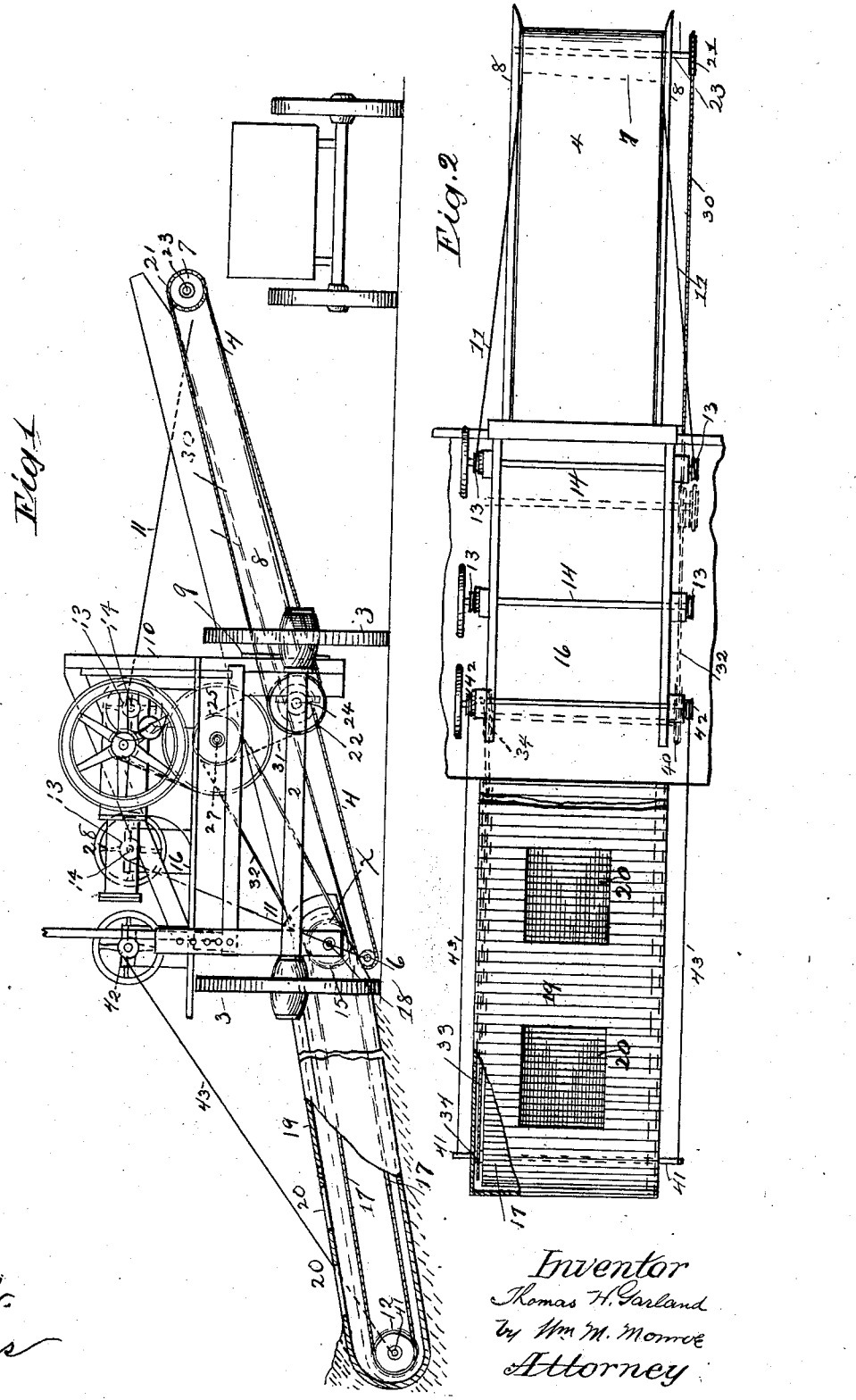
Witnesses
A. H. Gebert.
Nell Enns
Inventor
Thomas H. Garland
by Wm. M. Monroe
Attorney No. 734,315. PATENTED JULY 21, 1903.
T. H. GARLAND.
EXCAVATING MACHINE.
APPLICATION FILED JUNE 6, 1901.
NO MODEL. 2 SHEETS—SHEET 2.
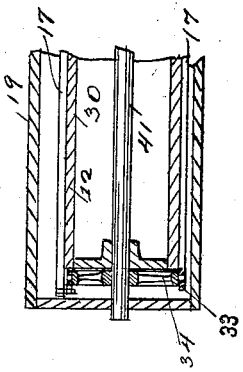
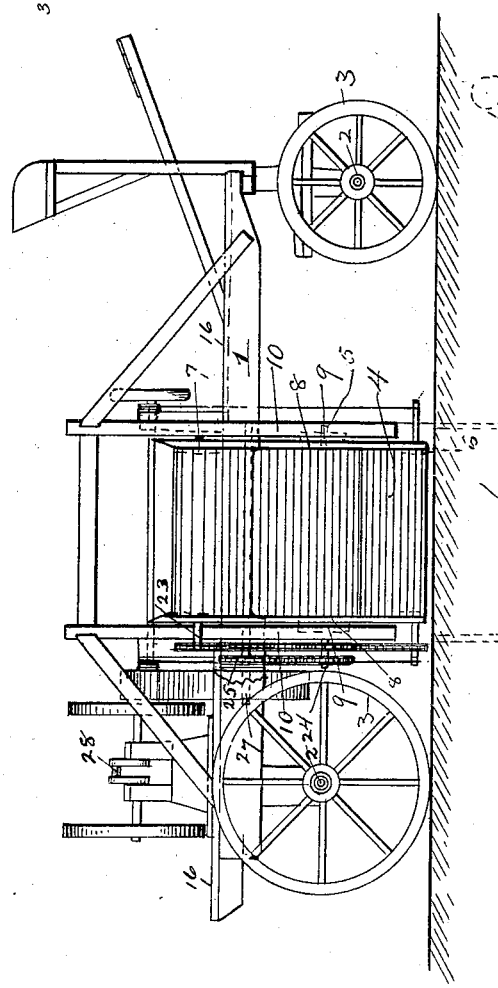
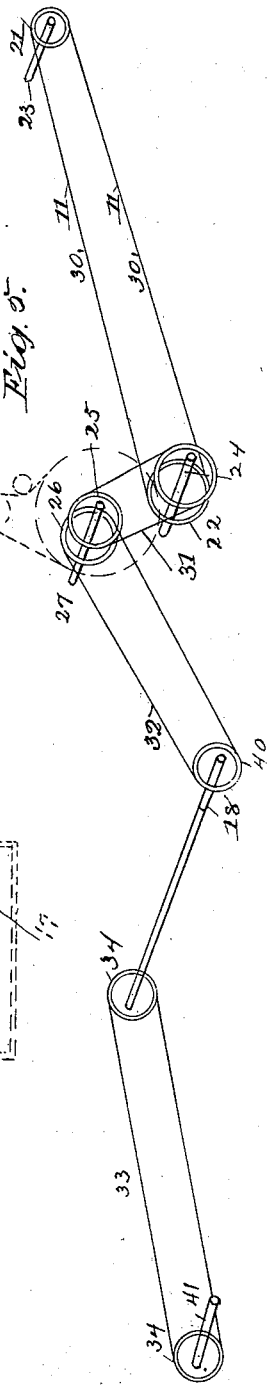
Witnesses.
Inventor
Thomas H. Garland
by Wm. H. Monroe
Attorney No. 734,315. Patented July 21, 1903.

UNITED STATES PATENT OFFICE.

THOMAS H. GARLAND, OF CLEVELAND, OHIO.

EXCAVATING-MACHINE.

SPECIFICATION forming part of Letters Patent No. 734,315, dated July 21, 1903.

Application filed June 6, 1901. Serial No. 63,442. (No model.)

*To all whom it may concern:*

Be it known that I, THOMAS H. GARLAND, a citizen of the United States, and a resident of Cleveland, county of Cuyahoga, State of Ohio, have invented certain new and useful Improvements in Excavating-Machines, of which I hereby declare the following to be a full, clear, and exact description, such as will enable others skilled in the art to which it appertains to make and use the same.

My invention relates to improvements in excavating-machines; and the objects of the machine are to provide means for elevating materials excavated and loading them upon wagons with greater facility than could be done by labor.

The machine is especially adapted to excavating deep cavities, such as are made for foundations, from which it would be difficult to draw loaded wagons; and it consists in the combination and arrangement of the devices hereinafter described, shown in the accompanying drawings, and specifically pointed out in the claim.

In the accompanying drawings, Figure 1 is a transverse section of the device. Fig. 2 is a plan thereof. Fig. 3 is a side elevation. Fig. 4 is a transverse section on line of shaft of the outer end of the depressible carrier. Fig. 5 is a diagrammatic view of driving-chains and sprockets.

In the views, 1 represents a wagon-frame mounted upon the usual axles and wheels 2 and 3 for the sake of portability. Transversely across this machine is seen an endless belt-carrier 4, raised at the outer end as high as shown in Fig. 1, so that a wagon can be driven underneath. This carrier is mounted upon drums 6 at the lower end and a drum 7 at the outer end. The outer end is supported upon a frame 8, pivoted upon a sliding block 9 in vertical guides 10, secured to the side of the wagon-frame. The frame 8 is supported at the pivotal point 24, so that the outer extremity can be raised or lowered to suit the convenience of the operator, as the height of the wagon may vary. Both outer and inner ends of this carrier are raised or lowered, by means of the chains or ropes 11 and pulleys 13 upon the shafts 14, above the wagon-platform 16. Upon the opposite side of the wagon to the elevated carrier is the inclosed endless carrier 17, mounted upon drums 12 and 15. The inner end X of this carrier is so placed as to discharge upon the carrier 4 and also pivoted upon its inner shaft 18, so that the outer extremity can be lowered nearly flat upon the ground near the portion to be excavated or can be lowered still farther into the excavation when that has been accomplished. This carrier is completely inclosed in a cover 19, forming a heavy platform on the upper surface upon which horses and scrapers can be supported and is provided with one or more openings 20, into which the dirt from the scrapers can be dumped as the horses drag them transversely across.

To permit the horses to readily cross the platform, the carrier should be sunk to its level in the earth or the dirt should be heaped about it sufficiently to form an incline on either side. With two holes at a slight distance apart two scrapers could be dumped at once if room is left for the horses to pass.

The carrier 4 is actuated by means of sprocket-wheels 21 and 22, respectively, on the shafts 23 and 24 and sprocket-wheel 25 upon the shaft 27, connected with engine 28, mounted upon the wagon-platform 16. Chains 30 and 31 drive the carrier sprocket-wheels, and a chain 33 connects sprocket-wheels 34 upon the drum-shafts 18 and 41 of the more horizontal carrier. Chain 32 connects the inner shaft 18 and sprocket 40 of this carrier with sprocket-wheel 26 upon the engine-driven shaft 27.

It will readily be seen that by means of this device the dirt can be rapidly scraped upon the platform 19 and transferred at once to the inclined carrier and thence to wagons, thus utilizing machinery in place of a great deal of manual labor in filling wagons and economizing a vast amount of time.

The carrier 17 and cover 19 are raised and lowered by means of the ropes 43 and pulley 42.

In Fig. 4 is shown a detail of the outer drum and sprocket. Here the drum and sprocket-chain are shown connected together by bolts, as 40, so that their movements must be simultaneous, and any unexpected friction can be more easily overcome.

Having described my invention, what I claim as new, and desire to secure by Letters Patent, is—

In an excavating-machine, in combination a portable frame, an inclined endless carrier, placed transversely across the frame, and projecting beyond one side thereof at the upper end, an endless carrier arranged to deposit dirt upon the first-named carrier, and projecting transversely beyond the opposite side of the frame, a platform over said second-named carrier, openings in said platform and means for driving said endless carriers and for raising and lowering the same, substantially as described.

In testimony whereof I have signed my name to this specification in the presence of two subscribing witnesses.

THOMAS H. GARLAND.

Witnesses:
WM. M. MONROE,
RUBY M. BROWNE.